United States Patent
Riach et al.

(10) Patent No.: US 6,937,290 B1
(45) Date of Patent: Aug. 30, 2005

(54) METHOD AND APPARATUS USING THE BRESENHAM ALGORITHM TO SYNTHESIZE A COMPOSITE SYNC SIGNAL

(75) Inventors: Duncan Riach, Mountain View, CA (US); Michael B. Nagy, Agoura Hills, CA (US)

(73) Assignee: NVidia Corporation, Santa Clara, CA (US)

(*) Notice: Subject to any disclaimer, the term of this patent is extended or adjusted under 35 U.S.C. 154(b) by 687 days.

(21) Appl. No.: 09/965,761

(22) Filed: Sep. 28, 2001

(51) Int. Cl.$^7$ .............................. H04N 5/06; H04N 5/49
(52) U.S. Cl. ....................... 348/521; 348/523; 348/524
(58) Field of Search ................................. 348/521, 524, 348/523; 463/40; 327/156, 159, 141; H04N 5/06, 5/49

(56) References Cited

U.S. PATENT DOCUMENTS

| | | | | |
|---|---|---|---|---|
| 4,991,188 A | * | 2/1991 | Perkins ........................ | 377/49 |
| 6,014,125 A | * | 1/2000 | Herbert ....................... | 345/660 |
| 6,269,136 B1 | * | 7/2001 | Hansen et al. ............... | 375/354 |
| 6,433,829 B1 | * | 8/2002 | Nagamine et al. .......... | 348/524 |
| 6,563,484 B1 | * | 5/2003 | Song ........................... | 345/98 |
| 6,597,403 B1 | * | 7/2003 | Nagamine et al. .......... | 348/521 |
| 6,727,956 B2 | * | 4/2004 | Suzuki et al. ................ | 348/524 |
| 6,778,170 B1 | * | 8/2004 | Shu et al. .................... | 345/213 |

* cited by examiner

Primary Examiner—John Miller
Assistant Examiner—Trang U. Tran (74) Attorney, Agent, or Firm—Moser Patterson & Sheridan LLP (57) ABSTRACT

A method and circuit for generating a train of synthesized sync pulses in accordance with the Bresenham algorithm in response to an input clock having frequency $F_i$, such that the leading edges of the pulses occur at least nearly periodically, with time-averaged frequency at least nearly equal to $(A/T) F_i$, where A and T are integers, and such that the accumulated error, between the actual time interval between the first and last leading edges of Z consecutive ones of the pulses and the time $ZT/(AF_i)$, never exceeds $1/F_i$. When $F_i$ is equal to $(T/A)F_o$, where $F_o$ is a predetermined output line frequency, an embodiment of the sync pulse generator includes an accumulator which stores a Count value, a comparator, and logic circuitry for generating the sync pulse train in response to a binary signal asserted by the comparator (and typically also control data that determines a configuration of the logic circuitry). The Count value is set to zero in response to a Frame Start event, and then increases by the above-noted integer value, A, once per input clock cycle. During each input clock cycle, the comparator compares the Count value in the accumulator with the above-noted integer value, T. In response to the comparator output indicating that the Count value has risen to a value greater than or equal to T, the Count value in the accumulator is reduced by the value T–A and the logic circuitry asserts the leading edge of a sync pulse. In typical cases in which the sync pulses are for use in clocking, generating, or synchronizing with a video signal (and the initial value is zero), the ratio T/A is equal to the number of input clock cycles per line of the video signal (i.e., the number of input clock cycles required to clock out a line of the video signal to a display device using an output clock having the output clock frequency).

53 Claims, 1 Drawing Sheet

METHOD AND APPARATUS USING THE BRESENHAM ALGORITHM TO SYNTHESIZE A COMPOSITE SYNC SIGNAL

TECHNICAL FIELD OF THE INVENTION

The present invention relates to methods and systems for generating synchronization pulses in response to an input clock so that the synthesized sync pulses have timing matching that of a video signal whose pixel clock has arbitrary frequency relative to the frequency of the available ("input") clock. The invention employs the Bresenham algorithm to synthesize horizontal sync (HSYNC) pulses with timing matching that of the HSYNC pulses of a video signal, or to synthesize a composite sync signal indicative of both HSYNC and vertical sync (VSYNC) pulses with timing matching that of the HSYNC and VSYNC pulses of a video signal.

BACKGROUND OF THE INVENTION

Video signals, including analog and digital video signals, have active video intervals (that determine horizontal lines of video) that alternate with horizontal and vertical blanking intervals. Each active video interval determines the pixels of a complete (or partial) horizontal line of pixels. Each horizontal blanking interval includes a horizontal synchronization (HSYNC) pulse. Each vertical blanking interval includes at least one vertical synchronization (VSYNC) pulse and typically also other data structures or signals.

Video signals (to be referred to as "progressive" video signals) for display by progressive scan display devices comprise sequences of frames. Each frame consists of a vertical blanking interval (including at least one VSYNC pulse) followed by N horizontal lines, where N is an integer. Each horizontal line comprises a horizontal blanking interval (including an HSYNC pulse) followed by active video. The duration of each vertical blanking interval is typically equal to M horizontal line periods (where M is an integer greater than or equal to 1). A typical vertical blanking interval includes M portions (each having duration equal to a horizontal line period), with one of these periods including a VSYNC pulse, and each of the other periods including an HSYNC pulse. A progressive raster-scan display device produces an image in response to each frame of a progressive video signal by filling in a sequence of N horizontal bands on a screen (from top to bottom), each band consisting of pixels determined by a different one of the N horizontal lines. The display device resets in response to the VSYNC pulse (or set of VSYNC pulses) in each vertical blanking interval, so that it is ready to produce another image in response to the next N horizontal lines containing active video.

Video signals (to be referred to as "interlaced" video signals) for display by interlaced scan display devices also comprise sequences of frames, but each frame consists of two fields: a top field and a bottom field. Each of the top fields comprises a vertical blanking interval (including at least one VSYNC pulse) followed by L horizontal lines, where L is a number (not necessarily an integer). Each of the bottom fields comprises a vertical blanking interval (including at least one VSYNC pulse) followed by L horizontal lines. Each horizontal line comprises a horizontal blanking interval (including an HSYNC pulse) followed by active video. The duration of each vertical blanking interval is typically equal to M horizontal line periods (where M is an integer greater than or equal to one), and a typical vertical blanking interval includes M portions (each having duration equal to a horizontal line period), with one of these periods including a VSYNC pulse (or VSYNC pulse train) and each of the other periods including an HSYNC pulse. An interlaced raster-scan display device produces an image on a screen (that can be thought of as comprising horizontal bands, numbered consecutively from top to bottom of the screen and thus including odd-numbered and even-numbered bands) in response to each frame of an interlaced video signal by filling in (at least partially) each of a sequence of L odd-numbered horizontal bands (from the top to the bottom of the screen), each odd-numbered band consisting of pixels determined by a different one of the horizontal lines of the top field, and then filling in (at least partially) each of a sequence of L even-numbered horizontal bands (from the top to the bottom of the screen), each even-numbered band consisting of pixels determined by a different one of the horizontal lines of the bottom field. The display device resets in response to the VSYNC pulse (or VSYNC pulses) in each vertical blanking interval, in the sense that it prepares to fill in even-numbered (or odd-numbered) bands of the screen in response to the next L horizontal lines containing active video.

One commonly used type of video game system asserts a video (typically analog video) signal to a TV monitor (or other display device) for display. Such a game system includes a CPU, graphics processing circuitry for generating frames of image data under control of the CPU, and a TV encoder for generating a video signal in response to the image data. The display device is coupled to receive and display the video signal generated by the TV encoder. The image data is clocked out of the graphics processing circuitry (to the TV encoder) in response to a pixel clock. While executing a game program (defined by commands stored in memory accessible by the CPU), the CPU processes input data from an input device (sometimes referred to as a game controller). During the game, a player manipulates the input device (e.g., a light gun) to point to locations on the screen of the display device, while the display device displays video on the screen.

One of the functions implemented by the CPU (referred to herein as a "pointing device function") is to determine the specific pixel or group of pixels (of the video frame being displayed) to which the input device points. Conventionally, in order to perform the pointing device function, the CPU (or circuitry coupled thereto) must have access to the video baseband signal sent to the display device (in order to extract the HSYNC and VSYNC pulses therefrom), or to a composite sync signal that has been generated from the video baseband signal or a composite sync signal that has been generated from the clock employed to generate the video baseband signal.

For example, in one conventional game system in which the input device is a light gun, the CPU (or circuitry coupled thereto) receives light intensity data (from a photodiode or other sensor in the light gun) and control data indicating whether the user is pulling the gun trigger. In response to control data indicating that the user has pulled the trigger, the CPU resets logic circuitry in the gun, and causes the screen to display a black image and then a white image. In response to light intensity data received from the gun during the sequential display of the black and white images, the CPU determines the specific pixel or group of pixels to which the gun is pointing. In order to make this determination, the CPU must know the time at which the first white pixel sensed by the gun is displayed relative to the assertion times of the HSYNC and VSYNC pulses of the displayed video signal. Typically, the gun captures a delay value (indicative of this relative time) from a counter, and the gun sends the delay value to the CPU so that the CPU can make the noted determination. In order for the gun to capture the delay value, sync stripping circuitry in (or coupled to) the gun extracts the HSYNC and VSYNC pulses from the video baseband signal sent to the display device, and the extracted HSYNC and VSYNC pulses are used to capture the delay value. However, because of the complexity of the data structures in the horizontal and vertical blanking intervals of the video baseband signal, complex circuitry is needed to extract the HSYNC and VSYNC pulses from the video baseband signal.

Until the present invention, it bad not been known how to synthesize a composite sync signal indicative of the timing information required to implement a pointing device function in a video game system (or other system), using simple circuitry and without the need to use the video baseband signal output by the system (or corresponding to the system's video output) or the clock employed to generate such video baseband signal. Nor had it been known how to synthesize a composite sync signal whose timing accurately matches that of the horizontal and vertical sync pulses of a video baseband signal, using simple circuitry, without the need to use the clock employed to generate the video baseband signal itself, and without the need to use a clock whose frequency $F_o$ satisfies $F_o=MF_p$ or $F_o=F_p/M$, where M is an integer and $F_p$ is the rate at which pixels of the video baseband signal are asserted to the display device.

The invention employs the Bresenham algorithm to generate a synthetic sync pulse train using simple circuitry. The Bresenham algorithm has been widely used in graphics processing systems to draw approximations of lines (having arbitrary slope) using pixels of a video signal, but it has not to the inventors' knowledge been used to generate synthetic sync pulses as in the present invention.

SUMMARY OF THE INVENTION

In a class of embodiments, the invention is a method and circuit for generating a train of synthesized sync pulses in accordance with the Bresenham algorithm in response to an input clock having frequency $F_i$. This is accomplished such that the leading edges of the pulses occur at least nearly periodically, with time-averaged frequency at least nearly equal to $(A/T)F_i$, where A and T are integers, and such that the accumulated error, between the actual time interval between the first and last leading edges of Z consecutive ones of the pulses, and the time $ZT/(AF_i)$, never exceeds $1/F_i$.

When $F_i$ is equal to $(T/A)F_o$, where $F_o$ is a predetermined output line frequency, a preferred embodiment of the inventive synthetic sync generator includes an accumulator, a comparator, and logic circuitry for generating the sync pulse train (in response to a binary signal asserted by the comparator, and typically also control data that determines a configuration of the logic circuitry). The accumulator stores a Count value. In response to each assertion of a signal indicative of a Frame Start event to the accumulator, the Count value is set to zero during the input clock cycle following assertion of such signal. The Count value then increases by the value, A, once per input clock cycle. During each input clock cycle, the comparator compares the Count value in the accumulator with the value, T. In response to the comparator output indicating that the Count value has risen to a value greater than T (or not less than T), the Count value in the accumulator is reduced by the value (T−A) and the logic circuitry asserts the leading edge of a sync pulse (both actions typically occur synchronously in the input clock cycle after the comparator output indicates that the Count value is greater than (or not less than) T). In typical cases in which the sync pulses are for use in clocking, generating, or synchronizing with a video signal, the ratio T/A is equal to the number of input clock cycles per line of the video signal (i.e., the number of input clock cycles required to clock out a line of the video signal to a display device using an output clock having the output clock frequency). This can usually be derived and expressed as a rational number with reasonable sized numerator and denominator in its simplified form. This is due to the rate at which frames or fields are entering the system being equal to the rate at which frames or fields are leaving the system and results in a fraction that can be derived from various finite integer system parameters. Because this ratio can be expressed as a rational number with reasonable sized numerator and denominator, the inventors have recognized that the problem addressed by the invention is ideally suited to application of the Bresenham algorithm.

In some embodiments, the input clock frequency $F_i$ is a pixel clock frequency (e.g., the frequency at which a video game system asserts image data pixels to a TV encoder), and the output clock frequency $XF_o$ (where X is an integer) is the rate at which the pixels of at least one line of a video signal of interest are asserted to a display device (e.g., the frequency at which a TV encoder asserts pixels of a video signal to a display device).

One embodiment of the invention is a sync generator for use in a video game system including a CPU, graphics processing circuitry for generating frames of image data under control of the CPU, an input device coupled to the CPU, and a TV encoder for generating a video signal in response to the image data. In use, the game system is coupled to a TV monitor (or other display device) which receives and displays the video signal generated by the TV encoder. In operation of the system, a pixel clock is employed to clock the image data out of the graphics processing circuitry to the TV encoder. Both the graphics processing circuitry and the inventive sync generator are coupled to receive the pixel clock, and the pixel clock is employed as the input clock for the sync generator (In some embodiments, the graphics processing circuitry generates the pixel clock itself). The sync generator is coupled and configured to generate the synthesized sync pulse train in response to the pixel clock and to assert the synthesized sync pulse train to the input device (and possibly also to the CPU) for use in performing a pointing device function. The CPU uses input data from the input device (e.g., a light gun), and a position value generated by the input device using the synthesized sync pulse train, to perform the pointing device function.

In a class of embodiments, the inventive sync generator is implemented as an FPGA (field-programmable gate array) or ASIC that includes an accumulator, a comparator, and logic circuitry for generating the sync pulse train (in response to a binary signal asserted by the comparator, and typically also control data that determines a configuration of the logic circuitry). For example, the inventive sync generator can be implemented as an ASIC with a graphics processor (i.e., on the same die as the graphics processor). The accumulator stores a Count value that is reset to an initial value (e.g., zero) in response to a signal indicative of a Frame Start event. Typically, the inventive circuitry operates synchronously in response to an input clock, and the Count value is reset during the input clock cycle following assertion of the signal indicative of the Frame Start event. After being reset, the Count value increases by an incremental value once per input clock (e.g., pixel clock) cycle. During each input clock cycle, the comparator compares the Count value in the accumulator with a threshold value. In response to the comparator output indicating that the Count value has risen to a value greater than (or not less than) the threshold value, the Count value in the accumulator is reduced by the threshold value (and increased by the incremental value) and the logic circuit asserts the leading edge of a sync pulse (both actions typically occur in the input clock cycle after the comparator output indicates that the Count value is greater than or not less than the threshold value). Typically, the logic circuitry is configured to assert a first sync pulse in response to each Frame Start event (e.g., in the input clock cycle following each Frame Start event or shortly thereafter. If the Count value is reset to the initial value on the cycle following a Frame Start event, then the sync pulse leading edge must be asserted on the cycle following that. However, if the Count value is reset to the incremental value plus the initial value after the Frame Start event, then the sync pulse leading edge must be asserted on the same cycle that the Count value is reset), and then to assert subsequent sync pulses in response to the comparator output until the next Frame Start event. In variations on the described embodiments, the Count value is reset to an initial value, the Count value then decreases by an incremental value once per input clock cycle, and in response to the comparator output indicating that the Count value has fallen to a value less than (or not greater than) a threshold value, the Count value in the accumulator is increased by the difference between the initial value and the threshold value (and decreased by the incremental value) and the logic circuit asserts the leading edge of a sync pulse.

Preferably, the user can program and reprogram the sync generator with the necessary Bresenham algorithm parameters (i.e., the threshold value, incremental value, and initial value) and preferably also with additional parameters such as parameters that determine the width of each sync pulse asserted at the output of the logic circuitry. In some embodiments in which the sync pulses are for use in clocking, generating, or synchronizing with a video signal (and the initial value of the Count value is zero), the ratio of the threshold value and incremental value is equal to the number of input clock cycles per line of the video signal (i.e., the number of input clock cycles required to clock out a line of the video signal to a display device using an output clock having the output clock frequency).

The inventive sync generator resets in response to Frame Start events, which typically occur periodically and are determined by a periodic Frame Start signal having frequency $F_f$. In some embodiments, for example, in which the sync pulse train generated in accordance with the invention is for use in clocking, generating, or synchronizing with a video signal (e.g., a video signal to be displayed by a video game system), the phase of the sync pulse train relative to the video signal should be fixed (and preferably predetermined) for a given set of control parameters. Typically, there is a small delay between the leading edge of the first pulse in the sync pulse train (generated in response to a Frame Start event) and the start of a frame of the video signal (or the start of the first line, or one of the first lines, of a bottom field of the video signal, where the video signal is an interlaced video signal).

In all embodiments, the variation in the time intervals between leading edges of consecutive synthesized sync pulses generated in accordance with the invention never exceeds $1/F_i$ (the period of the input clock), for a given configuration of control parameters. As noted above, the accumulated error, between the desired time ($Z/F_o$) between the first and last leading edges of a train of Z consecutive pulses of the synthesized pulse train, and the actual time interval between the first and last leading edges of the Z synthesized pulses, typically never exceeds $1/F_i$ (and in some embodiments, it does not exceed $1/(2F_i)$.

In some preferred embodiments, the sync pulse train generated in accordance with the invention is a synthesized composite sync signal comprising broad pulses (sometimes referred to herein as "long" or "wide" pulses) at least a subset of which are VSYNC pulses, and HSYNC pulses (which are narrower than the broad pulses). More specifically, the composite sync signal is generated cyclically, with each cycle having duration equal to ($1/F_f$), where $F_f$ is the frame rate of a video signal of interest (e.g., a video signal to be displayed by a video game system), where the input clock frequency $F_i$ (employed to generate the sync pulse train) is much greater than $F_f$. During each cycle of a preferred embodiment, a train of synthesized sync pulses is generated as follows: a broad sync pulse train (comprising one broad pulse or two or more broad pulses) followed by a train of narrow pulses (comprising two or more narrow pulses each having width less than that of each broad pulse). For example, each broad pulse train can consist of a single broad pulse. Optionally, the train of synthesized sync pulses also includes an initial train of narrow pulses (before the broad pulse train) comprising two or more narrow pulses each having width less than that of each broad pulse.

Using synthesized sync pulses generated in accordance with the invention, an input device (e.g., the input device of a video game system) and a processor (e.g., the CPU of the video game system) can accurately implement a pointing device function (to determine raster position of the input device) without having direct access to a composite video baseband signal (e.g., a video baseband signal sent to a TV monitor by a video game system) and without having access to an output clock (e.g., an output clock having frequency $F_q$ satisfying $F_q=MF_p$ or $F_q=F_p/M$, where M is an integer and $F_p$ is the rate at which pixels of the video baseband signal are asserted to the display device).

Another advantage of the invention is that the synthesized sync pulses generated in accordance with the invention are easier to interpret by simple circuitry than are the complicated data structures in the blanking intervals of a video baseband signal (e.g., the synthesized sync pulse train can be train of simple wide and narrow pulses, whereas the data structures in the blanking intervals of a video baseband signal are much more complicated). If a train of simple input clock pulses (of the type that can be used to clock a simple implementation of the inventive sync pulse generator) is available (e.g., in a stream of input image data) because it is provided for some other purpose, such input clock pulse train can be employed to clock the inventive sync pulse generator, thus eliminating the need for additional input clock generation circuitry (e.g., clock generator 8 of FIG. 1).

DETAILED DESCRIPTION OF THE PREFERRED EMBODIMENTS

A video game system which embodies the invention will be described with reference to FIG. 1. During operation, video game system 1 of FIG. 1 asserts a video signal to TV monitor 12 for display. While the player views the video displayed by monitor 12, he or she manipulates input device 14 (which can be light gun) to point to locations on the monitor screen, and input device 14 asserts input data to processor 2 of system 1. The input data is indicative of the location of a pixel (or small group of pixels) that is pointed to on the screen of monitor 12, and typically also other information such as the status of a trigger (or other player-actuated control) of device 14.

Processor 2 is coupled to memory 3 and graphics processing circuitry 4, and possibly to synthetic sync generator 10. In operation, processor 2 executes a game program defined by commands stored in memory 3, while interacting with and processing the data from device 14. Input device 14 captures the location that is being pointed to on the screen in response to a request to capture from the processor 2. Input device 14 does this by using the synthesized sync signal (from generator 10) as a timing reference and capturing a location measurement when it receives a pulse of light caused by the raster scan passing in front of it. Input device 14 is primed by processor 2 for capturing the location (to which input device 14 points) and the result is returned to processor 2.

Graphics processing circuitry 4 generates frames of image data under control of processor 2. The image data typically include game data read by circuitry 4 from memory 3 (in response to control signals from processor 2) or generated internally by graphics processing circuitry 4. In response to a pixel clock asserted by clock generator 8, graphics processing circuitry 4 clocks out the pixels of image data to TV encoder 6. Alternatively, the pixel clock is generated by graphics processing circuitry 4, rather than by clock generator 8 or other clock generator separate from circuitry 4.

TV encoder 6 receives the image data from circuitry 4, generates the output video signal in response to this image data, and asserts the pixels of the output video signal to monitor 12 at a rate determined by an output clock. The output clock can be generated by circuitry within encoder 6. The output clock frequency is set so that each line of the output video signal is "stretched" to fit the space available on the screen of monitor 12. The output video signal's VSYNC and HSYNC pulses have appropriate timing (in the output clock domain) to cause monitor 12 to fit each frame of the output video signal to the space available on the monitor screen.

Input device 14 and processor 2 use the composite sync signal from generator 10 to implement a pointing device function, in which input device 14 correlates light intensity from a region of the screen (the region to which input device 14 points) with the assertion times of the HSYNC and VSYNC pulses of the displayed video signal. Processor 2 displays a bright area over the entire screen so that as the raster beam passes the point to which input device 14 is pointing, it stimulates the input device 14 optically.

The pixel clock generated by clock generator 8 has frequency $F_i$, and the output clock (employed by TV encoder 6 to assert the output video signal to monitor 12) has frequency $XF_o$, where X is an integer equal to the number of output clock pulses per line of the output video signal. In general, neither the ratio $F_o/F_i$, nor its inverse, is an integer. Sync generator 10 includes circuitry, clocked by the pixel clock, to generate a train of sync pulses whose leading edges occur periodically (or nearly periodically), with period equal to (or nearly equal to) $1/F_o=T/(AF_i)$, where A and T are integers. This circuitry implements the Bresenham algorithm to generate the sync pulses such that their leading edges satisfy the following property: the accumulated error between the desired time ($Z/F_o$) between the first and last leading edges of each set of Z consecutive ones of the pulses, and the actual time interval between the first and last leading edges of the set of Z pulses, never exceeds $1/F_i$. In some embodiments, the circuitry is implemented such that the accumulated error never exceeds $1/(2F_i)$ for a given configuration of control parameters.

In a typical implementation, the output clock frequency $XF_o$ is 13.5 MHz, and the input clock frequency $F_i$ is some value other than 13.5 MHz. An NTSC video signal has 858 "13.5 MHz" output clock cycles per line. A video signal with PAL format has 864 "13.5 MHz" output clock cycles per line. Typically, the output clock frequency $XF_o$ is such that the pixels of each line of the video signal clocked out of TV encoder 6 fit within the visible part of monitor 12's screen.

The sync pulses generated in accordance with the invention satisfy $F_i/F_o=T/A$, where T and A are integers, $F_i$ is an input clock frequency, and $F_o$ is a predetermined average output frequency at which the sync pulses are asserted. For example, the sync pulses generated in accordance with the invention can be used to clock, generate, or synchronize with a video signal whose pixels are clocked for display by an output clock having frequency equal to $XF_o$. To appreciate how the Bresenham algorithm is used to implement the invention in the latter case, it is helpful to express as a ratio of integers the non-integral number of input clock periods ($1/F_i$) per output line (where "output line" denotes the time to scan out a line of the output video signal). For a progressive input, interlaced output video signal, this ratio is:

$$ICPOL=ICPIL*ILPIFRM*2/OLPOFRM,\text{ where}$$

ICPOL denotes the number of input clock periods per line of the output video signal (i.e., the number of input clock cycles required to clock one line of the output video signal out from TV encoder 6 to display device 12), ICPIL denotes the number of input clock cycles per input line (the number of input clock cycles required to clock one line of image data into TV encoder 6 from graphics processing unit 4), ILPIFRM denotes the number of input lines (i.e., lines of image data asserted by graphics processing unit 4 to TV encoder 6) per frame of input image data, and OLPOFRM denotes the number of lines per frame of the output video signal (number of lines per frame of the video signal asserted to display device 12).

For an interlaced output video signal, the quantity OLPOFLD (the number of lines per field of the output image), is not (in general) an integer, but the quantity 2*OLPOFLD=OLPOFRM is an integer. The quantity OLPOFRM is the number of lines per frame of output image data.

For a progressive input, progressive output video signal (or an interlaced input, interlaced output video signal), the ratio ICPOL is $$ICPOL=ICPIL*ILPIFRM/OLPOFRM,$$

where OLPOFRM denotes the number of lines per frame of the output video signal (number of lines per frame of the video signal asserted to display device 12).

For an interlaced input, progressive output video signal, the ratio ICPOL is $$ICPOL=ICPIL*ILPIFRM/(2*OLPOFRM).$$

In any scan period, the number of input image data values per line (e.g., the number of input image data values per line of the input image data asserted to TV encoder 6) can differ from the number of output video values per output video line (e.g., the number of output video values per line of the output video asserted by TV encoder 6 to display device 12) for any of a variety of reasons. Similarly, in any period between vertical retraces, the number of input image lines (e.g. the number of input image lines per frame or field asserted to the TV encoder 6) can differ from the number of output video lines between vertical retraces (e.g. the number of output video lines of the output video asserted by the TV encoder 6 to display device 12). However, the time between vertical retraces for the input image and the time between vertical retraces for the output image is always the same.

Figure 1:
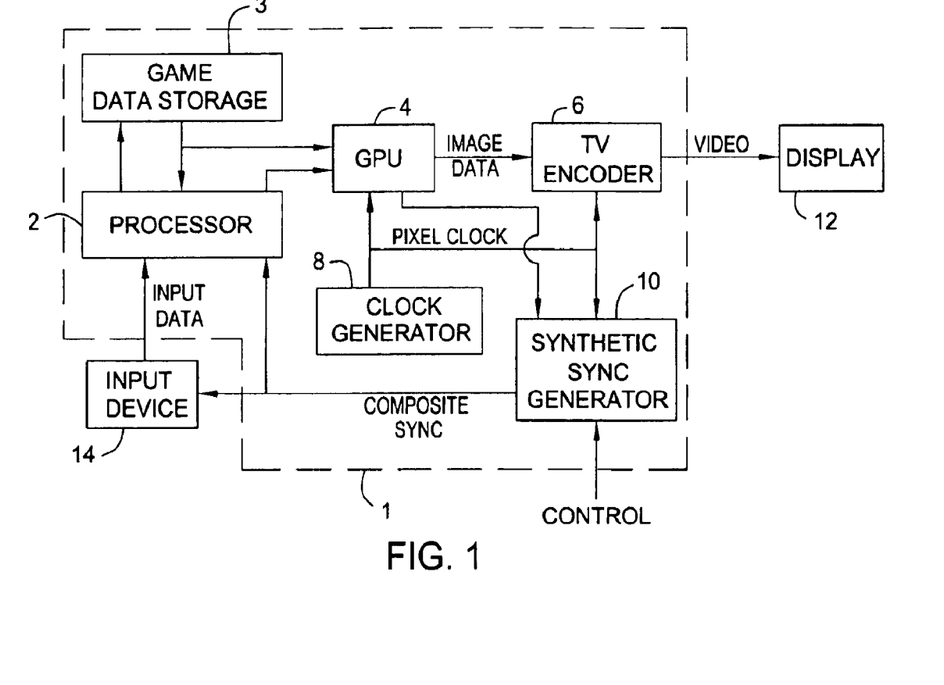
FIG. 1 is a block diagram of a video game system which embodies the invention.

In order to implement the Bresenham algorithm, a preferred embodiment of sync generator 10 of FIG. 1 is programmed with the numerator and denominator of the "ICPOL" fraction. If appropriate parameters are chosen for implementing the Bresenham algorithm, sync generator 10 asserts at its output a sequence of pulses, where the leading edge of the "(n+1)"th pulse in the sequence occurs either T1 or T2 seconds after the leading edge of the previous ("n"th) pulse, the difference between the values T2 and T1 is equal to one input clock period (T2−T1=1/$F_i$), each of the values T1 and T2 differs by less than 1/$F_i$ from the desired output clock period 1/$F_o$, and the accumulated error between the sum of all the intervals (each having value T1 or T2) between the successive pulses in each such sequence, and a value M (where M is equal to some integral multiple of the output clock period), is less than one input clock period (1/$F_i$) and in some embodiments is less than 1/(2$F_i$).

Figure 2:
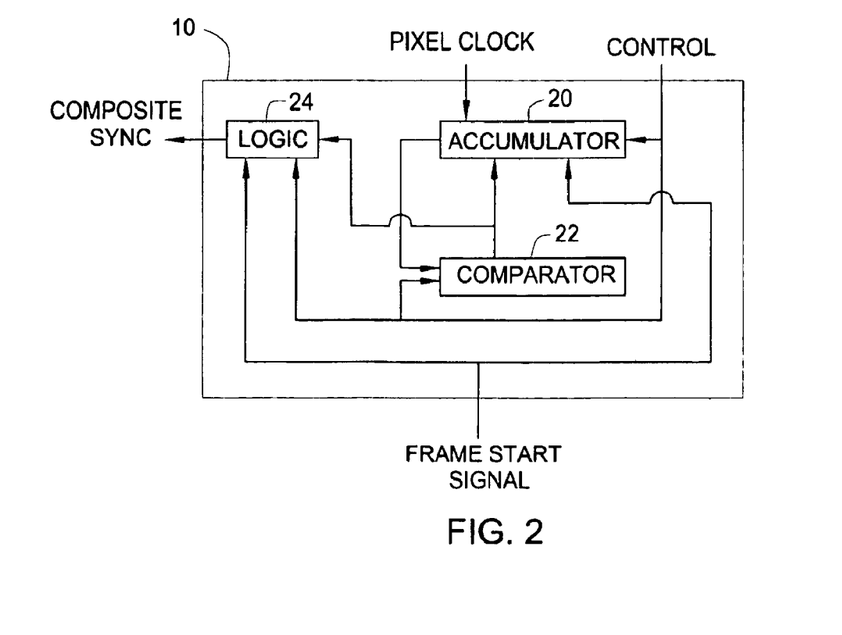
FIG. 2 is block diagram of sync generator 10 of FIG. 1, which is an embodiment of the inventive synthetic sync generator.

Preferably, sync generator 10 is implemented as an FPGA (field-programmable gate array) or ASIC, as shown in FIG. 2. The FIG. 2 implementation of sync generator 10 includes accumulator 20 which stores an accumulated value that increases by an incremental value during each input clock cycle (i.e., each pixel clock cycle) until it is reset, comparator 22 (having a first input coupled to receive the accumulated value in accumulator 20), and logic circuitry 24 coupled to the output of comparator 22. Logic circuitry 24 is configured to generate a train of sync pulses (as described in the previous paragraph, with time interval T1 or T2 between successive pulses of the train) in response to the binary output of comparator 22, when logic circuitry 24 has been programmed by user-supplied control data (a subset of the "Control" data indicated in FIG. 2). Comparator 22 compares the accumulated value in accumulator 20 with a user-specified threshold value N (an element of the "Control" data indicated in FIG. 2) asserted to its second input. The output of comparator 22 is not only asserted to logic circuitry 24 but also to accumulator 20, to control the operation of the accumulator (as described below) during the next input clock cycle after this accumulated value rises to a value greater than or equal to (or greater than) the threshold value N. Logic circuitry 24 asserts the leading edge of each sync pulse during the next input clock cycle after the output of comparator 22 indicates that the accumulated value has risen to a value greater than or equal to (or just greater than) the threshold value N.

Accumulator 20 stores a value to be denoted as "Count." Preferably, accumulator 20 is configured to reset "Count" to a programmable initial value 'I' in response to a periodic Frame Start signal (indicative of a periodic Frame Start event), to add a programmable value "D" to "Count" during each cycle of the input clock (the pixel clock) after a cycle in which Count is reset, and to subtract the value N−D (the programmable threshold value asserted to the comparator's second input, minus the programmable value D) from "Count" (to replace "Count" by the value "Count−N+D") when comparator 22's output indicates that "Count" has risen to a value greater than or equal to the threshold value "N" (or greater than the threshold value "N," in an alternative embodiment). Preferably, the FIG. 2 circuitry operates synchronously, so that "Count" is reset to the initial value "I" during the input clock cycle following receipt of each Frame Start signal, and "Count" is replaced by the value "Count−N+D" during the input clock cycle following each assertion of a comparator output indicating that "Count" has risen to a value greater than or equal to (or greater than) the threshold value "N." The Frame Start signal can be asserted to sync generator 10 by graphics processing circuitry 4.

In the case that the above-mentioned ratio $F_i/F_o=T/A$ is equal to the ratio ICPOL, and where the initial value "I" is equal to zero, the programmable value "D" in the two previous paragraphs should be equal to the denominator of the ratio ICPOL, and the threshold value "N" in the two previous paragraphs should be equal to the numerator of the ratio ICPOL. Thus, D=A=OLPOFRM, and N=T=(ICPIL*ILPIFRM*2) in an embodiment with progressive data in and interlaced data out, and N=T=ICPIL*ILPIFRM in embodiments in which both the input data and output data are interlaced or where both input data and output data are progressive and D=A=(OLPOFRM *2) and N=ICPIL*ILPIFRM in an embodiment with interlaced data in and progressive data out.

Sync generator 10 of FIG. 2 is reset in response to each assertion by graphics processing unit 4 of the periodic Frame Start signal (having frequency $F_f$). The Frame Start signal is typically a train of pulses which occur periodically with a phase that is fixed relative to the times at which GPU begins to clock out each frame of image data to TV encoder 6. When the sync pulses synthesized in accordance with the invention are for use in clocking, generating, or synchronizing with a video signal (e.g., for use by a TV encoder in generating an output video signal, in variations on the FIG. 1 system), the phase of the synthesized sync pulse train relative to the video signal is fixed.

Typically, when the sync pulses synthesized in accordance with the invention are for use in clocking, generating, or synchronizing with a progressive video signal, the leading edge of the first sync pulse generated after a Frame Start event occurs shortly before a VSYNC pulse of the video signal, and the leading edge of each other one of the sync pulses occurs shortly (e.g., a few microseconds) before an HSYNC pulse of the video signal.

Typically, when the sync pulses synthesized in accordance with the invention are for use in clocking, generating, or synchronizing with an interlaced video signal, the leading edge of the first sync pulse generated after a Frame Start event occurs a short time (e.g., a few microseconds, or a few microseconds plus a small number of line periods) before the start of the active part of a bottom field of the video signal, and the leading edge of each other one of the sync pulses occurs shortly (e.g., a few microseconds) before an HSYNC pulse of the video signal. In this case the inventive sync generator would assert the leading edge of the first synthesized sync pulse following a Frame Start event shortly before the leading edge of VSYNC for a frame of the interlaced video signal, and such leading edge of VSYNC would occur in the first line (or one of the first lines) of the frame's bottom field.

In any case in which the sync pulses synthesized in accordance with the invention are for use in clocking, generating, or synchronizing with a video signal, the sync generator can be implemented to wait for a fixed (but preferably programmable) number of input clock cycles following a Frame Start event before asserting the leading edge of the first sync pulse of a sync pulse train, or it can be implemented to assert the leading edge of the first sync pulse of such a train immediately upon (or within a very small number of input clock cycles after) occurrence of a Frame Start event.

In response to each Frame Start event, the value stored in accumulator 20 is reset (typically to zero), and logic circuitry 24 asserts a first pulse having appropriate pulse width (typically a width greater than that of each subsequent pulse of the synthesized sync pulse train, in cases in which the synthesized sync pulses are for use in clocking, generating, or synchronizing with an output video signal). In this way, the phase of the sync pulse train asserted at the output of logic circuitry 24 is determined relative to the VSYNC and HSYNC of the output video signal. Typically, the Control data asserted to sync generator 10 includes data (asserted from TV encoder 6 to logic circuitry 24) indicative of whether a top field or a bottom field of interlaced video is being asserted to display device 12, for use by logic circuitry 24 in generating the sync pulse train in cases where progressive data is input to TV encoder 6 and interlaced data is output from TV encoder 6. In this case, it is necessary for synthetic sync generator 10 to know for a given frame (and associated VSYNC pulse asserted to TV encoder 6) whether that frame will result in the top field or the bottom field out of TV encoder 6 and so whether that VSYNC pulse asserted to TV encoder 6 constitutes a "frame start event" or not.

Thus, in response to assertion of each Frame Start signal, the "Count" value in accumulator 20 becomes Count=I (with I typically being equal to zero). Thereafter, "Count" increases by the value "D" once per input clock cycle and comparator 22 compares the increased value of "Count" with the threshold "N." This continues until "Count" rises to a value greater than or equal to (or greater than) "N" (as indicated comparator 22's binary output), at which time "N−D" is subtracted from the "Count" value. In other words, "Count" (during the "n"th input clock cycle) is replaced by "Count+D" (in response to the leading edge of the next input clock), until "Count" rises to a value greater than or equal to (or greater than) "N" at which time "Count" is replaced by "Count−N+D". In response to comparator 22's binary output being active, logic circuitry 24 asserts the next one of the synthetic sync pulses at its output.

For example, to cause logic circuit 24 to assert one synthetic sync pulse (on the average) per 312.5 pixel clock cycles, the programmable values loaded into circuit 10 can be: D=2; I=0; and N=625. Commencing upon the resetting of accumulator 20 to Count=I=0 (in response to a Frame Start event), the value of Count increases by D=2 once per pixel clock cycle. In response to assertion of the 313th leading edge of the pixel clock, "Count" reaches the value Count=626, logic circuitry 24 asserts the leading edge of a sync pulse at its output, and "Count" is changed to 626−N+D=626−625+2=3. Having been changed to 3, Count again increases (this time through a series of odd rather than even values) until it reaches the value Count=625 in response to assertion of the 312th pixel clock leading edge (after the pixel clock cycle in which Count is changed to 3). During the pixel clock cycle in which "Count" becomes equal to 625, logic circuitry 24 asserts the leading edge of the next sync pulse at its output, and "Count" is again reset (this time to Count=625−625+2=2). Typically, these events repeat many times until the next Frame Start event. In this way, the average interval between circuit 24's assertion of sync pulses is 312.5 pixel clocks. The error for any line (i.e., the time interval between assertion of "N"th synthetic sync pulse after the Frame Start event, and N*312.5 pixel clock cycles) is no more than one half of the pixel clock period. If the frame start event causes the Count value to become zero on the cycle following it's assertion, then given the above specifics, the leading edge of the synthesized sync pulse should become active on the cycle following the one in which the Count value becomes zero so that the time between the leading edge of the initial pulse after the frame start event and the subsequent pulse (in this instance the leading edge of which becomes active on the cycle following the one in which the contents of the accumulator is equal to or greater than N) is correct for the sequence.

The FIG. 2 circuit is programmed and reprogrammed by the Control data with the necessary Bresenham algorithm parameters and preferably also with additional parameters such as parameters that determine the width of each sync pulse asserted at the output of logic circuitry 24.

Each time a Frame Start event occurs, logic circuitry 24 begins to drive the composite sync signal. In a preferred implementation, it drives this signal active for a programmable number of pixel clock cycles W (commencing at the Frame Start event) before driving it inactive again (thereby asserting a VSYNC pulse of length "W" pixel clock cycles). At the time when the composite sync signal begins to be driven active, the Count value stored in accumulator 20 is reset to "I" (which is typically zero). Then, on each pixel clock edge, the programmable value "D" is added to the Count value, the increased Count value is compared with the programmable threshold value "N," and if the increased Count value is greater than or equal to (or greater than) "N," then "N−D" is subtracted from the increased Count value. When the Count value rises to the value "N," the number of pixel clock cycles that have passed since the last leading edge of the composite sync signal is equal to or slightly greater (by a fraction of a pixel clock) than the number of pixel clocks in an output line. In some embodiments, the number of pixel clock cycles that have passed can be slightly less than the number of pixel clocks in an output line. For this reason, when the Count value rises to be at least equal to the threshold value "N," the composite sync signal is again made active (i.e., the leading edge of the next sync pulse is asserted) and remains active for a programmable number "X" of pixel clock cycles which is in general different from the number of clock cycles ("WE") for which the signal is active just following a Frame Start event. In preferred embodiments, W>X, the first sync pulse (asserted at a Frame Start event) has relative long length W and all subsequent sync pulses (until the next Frame Start event) have shorter length X.

In alternative embodiments, each of the first P sync pulses (commencing on a Frame Start event) has length "W" (e.g., P=21), and all subsequent sync pulses (until the next Frame Start event) have a shorter length "X." The circuitry (e.g., in input device 14 and/or processor 2) that processes the sync pulse train generated in such alternative embodiments is typically configured to recognize the leading edge of the first one of the "P" consecutive pulses having length "W" as a VSYNC pulse, and all other pulses of the train as HSYNC pulses. In other embodiments, the first sync pulse (or first set of "P" sync pulses) generated in accordance with the invention in response to a Frame Start event is otherwise indicative of a VSYNC pulse, and all subsequent sync pulses (until the next Frame Start event) are HSYNC pulses (e.g., the first sync pulse, or each of the first "P" sync pulses, can be narrower than the subsequent sync pulses).

The FIG. 2 circuit carries forward the fractional pixel clock period error in accumulator 20 from output line period to output line period after each Frame Start event, by resetting "Count" to "Count−N+D" whenever "Count" rises to be equal to or greater than "N" (in accordance with the Bresenham algorithm). This prevents deviation of the leading edges of the synthesized composite sync signal pulses from the leading edges of the desired horizontal sync pulses in the composite video signal (after accounting for a constant offset) by more than a pixel clock (or by more than half a pixel clock in some embodiments).

The arithmetic ranges needed for the values "Count" and "N" of the FIG. 2 circuit are dependent on the values of the numerator and denominator of the ICPOL ratio to be implemented. In typical embodiments that generate sync pulses for use in clocking NTSC or PAL output video signals, it will probably be sufficient for the "Count" value and the "N" value to each be a 24-bit word and for the value "D" to be an 11-bit word.

The inventive sync synthesis engine can be implemented (e.g., as an FPGA) as part of an integrated circuit, for example an integrated circuit in which the synthesized sync pulse train is fed to a set of game controller ports (e.g., USB game controller ports) or to a processor coupled to receive data from a game controller. Preferably, the engine is implemented with controllable parameters, and the integrated circuit is configured for use in a system in which the engine can be programmed and reprogrammed conveniently and appropriately for each of at least two operating modes (e.g., input and output resolution combinations).

In one implementation of the FIG. 1 system having three basic modes of operation, the characteristics of the synthesized composite sync signal, and the general configuration information for each mode, are as follows. Preferably, in all modes, each relatively wide synthesized sync pulse (e.g., an initial, relatively wide sync useful as a VSYNC pulse) is programmed to have length equal to 80% of the line period, and each relatively narrow synthesized sync pulse (useful as HSYNC pulse) is programmed to have length equal to 20% of the line period. Alternatively, the width of each relatively wide and each relatively narrow sync pulse in each mode is some other predetermined multiple of pixel clock periods, although the pulse widths are preferably consistent across all modes.

In the first mode, sometimes referred to as a "TV Encoder Non-Bypass Mode," the sync pulses generated by sync generator 10 in accordance with the invention are used by input device 14 to implement a pointing device function, and TV encoder 6 generates an interlaced output video signal. In this mode, sync generator 10 is programmed with the value "N" equal to ICPIL*ILPIFRM *2 (the numerator of the above-noted expression ICPOL=ICPIL*ILPIFRM* 2/OLPOFRM), the value "D" equal to OLPOFRM (the denominator of this expression), and the value "I" equal to zero. Sync generator 10 is programmed to assert a single broad synthesized sync pulse upon receiving a Frame Start signal indicative of a Frame Start event such that the leading edge of the broad synthesized sync pulse occurs a short time (M microseconds) before the leading edge of HSYNC at the start of line 4 of a bottom field of the output video signal asserted by TV encoder 6 to monitor 12 where the output video signal has NTSC format (or M microseconds before the leading edge of HSYNC at the start of line 1 of a bottom field of the output video signal, where the output video signal has PAL format). After the initial broad sync pulse (and until the next Frame Start event), all subsequent synthesized sync pulses are narrow and their leading edges occur M microseconds before the leading edges of subsequent HSYNC pulses of the output video signal. This continues through two complete fields until line 4 (in NTSC, line 1 in PAL) of the next bottom field of the output video signal occurs again, at which time the process repeats (with sync generator 10 asserting another broad sync pulse followed by another train of narrow sync pulses).

In the second mode, sometimes referred to as a "TV Encoder Bypass Mode with Progressive Syncs," a video data source asserts video data to an interface circuit (which clocks out frames of the video data to a progressive-scan display device with appropriate timing), and the sync pulses generated by sync generator 10 in accordance with the invention are used by input device 14 to implement a pointing device function. In this mode, sync generator 10 is programmed with the value "N" equal to HTOTAL (the number of input clock cycles per line of video data to be sent to the display device), the value "D" equal to one, and the value "I" equal to zero. Sync generator 10 is programmed to assert a single broad synthesized sync pulse upon receiving a Frame Start signal indicative of a Frame Start event such that the leading edge of the broad synthesized sync pulse occurs a short time (Q nanoseconds) before the leading edge of HSYNC at the start of line 1 of a frame of the output video asserted to the display device. After the initial broad sync pulse (and until the next Frame Start event), all subsequent synthesized sync pulses are narrow and their leading edges occur Q nanoseconds before the leading edges of subsequent HSYNC pulses of the output video frame. This continues through a complete frame until line 1 of the next output video frame occurs, at which time the process repeats (with sync generator 10 asserting another broad sync pulse followed by another train of narrow sync pulses).

In the third mode, sometimes referred to as a "TV Encoder Bypass Mode with Interlaced Syncs," a video data source asserts video data to an interface circuit (which clocks out frames of the video data to an interlaced-scan display device with appropriate timing), and the sync pulses generated by sync generator 10 in accordance with the invention are used by input device 14 to implement a pointing device function. In this mode, sync generator 10 is programmed with the value "N" equal to HTOTAL (the number of input clock cycles per line of video data to be sent to the display device), the value "D" equal to one, and the value "I" equal to zero. Sync generator 10 is programmed to assert a single broad synthesized sync pulse upon receiving a Frame Start signal indicative of a Frame Start event such that the leading edge of the broad synthesized sync pulse occurs a short time (Q nanoseconds) before the leading edge of HSYNC at the start of line 1 of a bottom field of the output video asserted to the display device. After the initial broad sync pulse (and until the next Frame Start event), all subsequent synthesized sync pulses are narrow and their leading edges occur Q nanoseconds before the leading edges of subsequent HSYNC pulses of the output video. This continues through two complete fields until line 1 of the next bottom field of the output video occurs, at which time the process repeats (with sync generator 10 asserting another broad sync pulse followed by another train of narrow sync pulses).

In the described three-mode implementation of the FIG. 1 system, and in other embodiments of the invention in which the inventive sync generator is selectively operable in any of multiple modes to generate sync pulses for use in generating, or clocking or otherwise processing a video signal, the phase of the train of synthesized sync pulses relative to the position of the raster will, in general, be different in different ones of the modes. Thus, the video signal processing delays for which the inventive sync pulse generator or the processor will need to compensate will, in general, be constant for each mode but different between any two modes. In some implementations, it will be sufficient to provide predetermined mode-dependant operating parameters. However, in other implementations, it may be necessary to provide the processor not only with predetermined operating parameters (calibration starting points) for each mode, but also with the ability to calibrate the sync generator in each mode and each display device with which it will be used. In some implementations, it will likely be sufficient for the user to calibrate the sync generator once for each display device with which it is used.

It should be understood that while certain forms of the invention have been illustrated and described herein, the invention is not to be limited to the specific embodiments described and shown or the specific methods described.

What is claimed is:

1. A circuit for generating a train of synthesized sync pulses in accordance with the Bresenham algorithm in response to an input clock having frequency $F_i$, including:

first circuitry coupled to receive the input clock and configured to generate a control signal indicative of events having time-averaged frequency at least nearly equal to $(A/T)F_i$, where A and T are integer values, such that accumulated error, between a first time from a first one to a last one of Z consecutive ones of said events and a second time equal to $ZT/(AF_i)$, never exceeds $1/F_i$; and second circuitry coupled to receive the control signal and configured to assert the sync pulses in response to said control signal such that leading edges of the pulses occur at least nearly periodically, with said time-averaged frequency at least nearly equal to $(A/T)F_i$, and with accumulated error, between a third time from a first one to a last one of Z consecutive ones of said leading edges and the second time $ZT/(AF_i)$, that never exceeds $1/F_i$.

2. The circuit of claim 1, wherein the first circuitry comprises:

an accumulator configured to store a Count value, and to increase the Count value by the value A during each cycle of the input clock; and a comparator coupled to the accumulator and configured to perform a comparison of the Count value with the value T during each cycle of the input clock and to generate an output signal indicative of the result of each said comparison, wherein the accumulator is coupled to receive the output signal and configured to reduce the Count value by the value T−A when the output signal indicates that the Count value has risen to a value greater than or equal to said value T, and wherein the output signal is said control signal.

3. The circuit of claim 2, wherein the accumulator is coupled to receive a frame start signal indicative of sequence of frame start events, and the accumulator is configured to reset the Count value to an initial value I whenever the frame start signal is indicative of one of the frame start events.

4. The circuit of claim 3, wherein the initial value I is equal to zero.

5. The circuit of claim 4, wherein the second circuitry is logic circuitry coupled to receive the output signal and the frame start signal, and configured to assert one of the sync pulses whenever the frame start signal is indicative of one of the frame start events, and whenever the output signal indicates that the Count value has risen to said value greater than or equal to said value T.

6. The circuit of claim 5, wherein the logic circuitry is configured to assert each of the sync pulses with any selected one of at least two different pulse widths.

7. The circuit of claim 5, wherein the frame start events occur with a first phase, and the logic circuitry is configured to assert the sync pulses so that their leading edges have any selected one of at least two different phases relative to said first phase.

8. The circuit of claim 4, wherein the second circuitry is logic circuitry coupled to receive the output signal and the frame start signal, and configured to assert one of the sync pulses having a first width whenever the frame start signal is indicative of one of the frame start events, and to assert one of the sync pulses having a second width whenever the output signal indicates that the Count value has risen to said value greater than or equal to said value T, wherein the first width is different than the second width.

9. The circuit of claim 8, wherein the first width is greater than the second width, and the logic circuitry is configured to set each of the first width and the second width to be any selected one of a set of at least two different pulse widths.

10. The circuit of claim 1, wherein the first circuitry comprises:

an accumulator configured to store a Count value, and to increase the Count value by the value A during each cycle of the input clock; and a comparator coupled to the accumulator and configured to perform a comparison of the Count value with the value T during each cycle of the input clock and to generate an output signal indicative of the result of each said comparison, wherein the accumulator is coupled to receive the output signal and configured to reduce the Count value by the value T−A when the output signal indicates that the Count value has risen to a value greater than said value T, and wherein the output signal is said control signal.

11. The circuit of claim 10, wherein the accumulator is coupled to receive a frame start signal indicative of sequence of frame start events, and the accumulator is configured to reset the Count value to an initial value I whenever the frame start signal is indicative of one of the frame start events.

12. The circuit of claim 11, wherein the initial value I is equal to zero, the second circuitry is logic circuitry coupled to receive the output signal and the frame start signal, and configured to assert one of the sync pulses whenever the frame start signal is indicative of one of the frame start events, and whenever the output signal indicates that the Count value has risen to said value greater than said value T.

13. The circuit of claim 1, wherein the first circuitry comprises:

an accumulator configured to store a Count value, and to decrease the Count value by the value A during each cycle of the input clock, wherein the accumulator is coupled to receive a frame start signal indicative of sequence of frame start events, and the accumulator is configured to set the Count value to an initial value I=X+T, whenever the frame start signal is indicative of one of the frame start events, where X is a value and T is an integer value; and a comparator coupled to the accumulator and configured to perform a comparison of the Count value with the value X during each cycle of the input clock and to generate an output signal indicative of the result of each said comparison, wherein the accumulator is coupled to receive the output signal and configured to increase the Count value by the value T−A when the output signal indicates that the Count value has fallen to a value less than or equal to said value X, and wherein the output signal is said control signal.

14. The circuit of claim 13, wherein the second circuitry is logic circuitry coupled to receive the output signal and the frame start signal, and configured to assert one of the sync pulses whenever the frame start signal is indicative of one of the frame start events, and whenever the output signal indicates that the Count value has fallen to said value less than or equal to said value X.

15. The circuit of claim 1, wherein the first circuitry comprises:

an accumulator configured to store a Count value, and to decrease the Count value by the value A during each cycle of the input clock, wherein the accumulator is coupled to receive a frame start signal indicative of sequence of frame start events, and the accumulator is configured to set the Count value to an initial value I=X+T, whenever the frame start signal is indicative of one of the frame start events, where X is a value and T is an integer value; and a comparator coupled to the accumulator and configured to perform a comparison of the Count value with the value X during each cycle of the input clock and to generate an output signal indicative of the result of each said comparison, wherein the accumulator is coupled to receive the output signal and configured to increase the Count value by the value T−A when the output signal indicates that the Count value has fallen to a value less than said value X, and wherein the output signal is said control signal.

16. The circuit of claim 15, wherein the second circuitry is logic circuitry coupled to receive the output signal and the frame start signal, and configured to assert one of the sync pulses whenever the frame start signal is indicative of one of the frame start events, and whenever the output signal indicates that the Count value has fallen to said value less than said value X.

17. A circuit for generating a train of synthesized sync pulses in accordance with the Bresenham algorithm in response to an input clock having frequency $F_i$, including:

an accumulator configured to store a Count value, and to increase the Count value by an integer value D during each cycle of the input clock;

a comparator coupled to the accumulator and configured to perform a comparison of the Count value with a threshold value N during each cycle of the input clock and to generate an output signal indicative of the result of each said comparison, wherein N is an integer, wherein the accumulator is coupled to receive the output signal and configured to reduce the Count value by the value N−D when the output signal indicates that the Count value has risen to a value greater than or equal to said value N; and pulse generation circuitry coupled to receive the control signal and configured to assert the sync pulses in response to said control signal.

18. The circuit of claim 17, wherein the pulse generation circuitry is configured to generate the sync pulses such that leading edges of the sync pulses occur with accumulated error, between a time from a first one to a last one of Z consecutive ones of said leading edges and a second time equal to $ZN/(DF_i)$, that never exceeds $1/F_i$.

19. The circuit of claim 17, wherein said circuit is a field-programmable gate array.

20. The circuit of claim 17, wherein the accumulator is coupled to receive a frame start signal indicative of sequence of frame start events, and the accumulator is configured to reset the Count value to an initial value I whenever the frame start signal is indicative of one of the frame start events.

21. The circuit of claim 20, wherein the initial value I is equal to zero.

22. The circuit of claim 20, wherein the pulse generation circuitry is logic circuitry coupled to receive the output signal and the frame start signal, and configured to assert one of the sync pulses whenever the frame start signal is indicative of one of the frame start events, and whenever the output signal indicates that the Count value has risen to said value greater than or equal to said value N.

23. A circuit for generating a train of synthesized sync pulses in accordance with the Bresenham algorithm in response to an input clock having frequency $F_i$, including:

an accumulator configured to store a Count value, and to increase the Count value by an integer value D during each cycle of the input clock;

a comparator coupled to the accumulator and configured to perform a comparison of the Count value with a threshold value N during each cycle of the input clock and to generate an output signal indicative of the result of each said comparison, wherein N is an integer, wherein the accumulator is coupled to receive the output signal and configured to reduce the Count value by the value N−D when the output signal indicates that the Count value has risen to a value greater than said value N; and pulse generation circuitry coupled to receive the control signal and configured to assert the sync pulses in response to said control signal.

24. The circuit of claim 23, wherein the accumulator is coupled to receive a frame start signal indicative of sequence of frame start events, the accumulator is configured to reset the Count value to an initial value I whenever the frame start signal is indicative of one of the frame start events, the initial value I is equal to zero, and the pulse generation circuitry is logic circuitry coupled to receive the output signal and the frame start signal, and configured to assert one of the sync pulses whenever the frame start signal is indicative of one of the frame start events, and whenever the output signal indicates that the Count value has risen to said value greater than said value N.

25. A circuit for generating a train of synthesized sync pulses in accordance with the Bresenham algorithm in response to an input clock having frequency $F_i$, including:

an accumulator configured to store a Count value, and to decrease the Count value by an integer value D during each cycle of the input clock, wherein the accumulator is coupled to receive a frame start signal indicative of sequence of frame start events, and the accumulator is configured to set the Count value to an initial value I=X+N, whenever the frame start signal is indicative of one of the frame start events, where X is a value and N is an integer value; and a comparator coupled to the accumulator and configured to perform a comparison of the Count value with the value X during each cycle of the input clock and to generate an output signal indicative of the result of each said comparison, wherein the accumulator is coupled to receive the output signal and configured to increase the Count value by the value N−D when the output signal indicates that the Count value has fallen to a value less than or equal to said value X; and pulse generation circuitry coupled to receive the control signal and configured to assert the sync pulses in response to said control signal.

26. The circuit of claim 25, wherein the pulse generation circuitry is logic circuitry coupled to receive the output signal and the frame start signal, and configured to assert one of the sync pulses whenever the frame start signal is indicative of one of the frame start events, and whenever the output signal indicates that the Count value has fallen to said value less than or equal to said value X.

27. A circuit for generating a train of synthesized sync pulses in accordance with the Bresenham algorithm in response to an input clock having frequency $F_i$, including:

an accumulator configured to store a Count value, and to decrease the Count value by an integer value D during each cycle of the input clock, wherein the accumulator is coupled to receive a frame start signal indicative of sequence of frame start events, and the accumulator is configured to set the Count value to an initial value I=X+N, whenever the frame start signal is indicative of one of the frame start events, where X is a value and N is an integer value; and a comparator coupled to the accumulator and configured to perform a comparison of the Count value with the value X during each cycle of the input clock and to generate an output signal indicative of the result of each said comparison, wherein the accumulator is coupled to receive the output signal and configured to increase the Count value by the value N−D when the output signal indicates that the Count value has fallen to a value less than said value X; and pulse generation circuitry coupled to receive the control signal and configured to assert the sync pulses in response to said control signal.

28. The circuit of claim 27, wherein the pulse generation circuitry is logic circuitry coupled to receive the output signal and the frame start signal, and configured to assert one of the sync pulses whenever the frame start signal is indicative of one of the frame start events, and whenever the output signal indicates that the Count value has fallen to said value less than said value X.

29. A system for generating a video signal, including:

a TV encoder having an output;

graphics processing circuitry coupled to the clock generator and the TV encoder, and configured to clock out frames of image data to the TV encoder in response to an input clock having frequency $F_i$, wherein the TV encoder is configured to generate a video signal in response to the image data and to clock out pixels of the video signal to the output in response to an output clock; and a sync generator circuit coupled and configured to generate a train of synthesized sync pulses in accordance with the Bresenham algorithm in response to the input clock, wherein said sync generator circuit includes:

first circuitry coupled to receive the input clock and configured to generate a control signal indicative of events having time-averaged frequency at least nearly equal to $(A/T)F_i$, where A and T are integer values, such that accumulated error, between a first time from a first one to a last one of Z consecutive ones of said events and a second time equal to $ZT/(AF_i)$, never exceeds $1/F_i$; and second circuitry coupled to receive the control signal and configured to assert the sync pulses in response to said control signal such that leading edges of the pulses occur at least nearly periodically, with said time-averaged frequency at least nearly equal to $(A/T)F_i$, and with accumulated error, between a third time from a first one to a last one of Z consecutive ones of said leading edges and the second time $ZT/(AF_i)$, that never exceeds $1/F_i$.

30. The system of claim 29, wherein the output clock has frequency $XF_o$, X is an integer, and the frequency $F_i$ is equal to $(T/A)F_o$, and wherein the first circuitry comprises:

an accumulator configured to store a Count value, and to increase the Count value by the value A during each cycle of the input clock; and a comparator coupled to the accumulator and configured to perform a comparison of the Count value with the value T during each cycle of the input clock and to generate an output signal indicative of the result of each said comparison, wherein the accumulator is coupled to receive the output signal and configured to reduce the Count value by the value T−A when the output signal indicates that the Count value has risen to a value greater than or equal to the value T, and wherein the output signal is said control signal.

31. The system of claim 30, wherein the accumulator is coupled to receive a frame start signal indicative of sequence of frame start events, and the accumulator is configured to reset the Count value to an initial value I whenever the frame start signal is indicative of one of the frame start events.

32. The system of claim 31, wherein the initial value I is equal to zero.

33. The system of claim 31, wherein there are ICPOL cycles of the input clock per line of the video signal, where ICPOL=ICPIL*ILPIFRM*2/OLPOFRM, where ICPIL is the number of input clock cycles per line of the image data, ILPIFRM is the number of lines of the image data per frame of the image data, and OLPOFRM is the number of lines of the video signal per frame of said video signal, and wherein the value T is equal to ICPIL*ILPIFRM*2, and the value A is equal to OLPOFRM.

34. The system of claim 31, wherein there are ICPOL cycles of the input clock per line of the video signal, where ICPOL=ICPIL*ILPIFRM/OLPOFRM, where ICPIL is the number of input clock cycles per line of the image data, ILPIFRM is the number of lines of the image data per frame of the image data, and OLPOFRM is the number of lines of the video signal per frame of said video signal, and wherein the value T is equal to ICPIL*ILPIFRM, and the value A is equal to OLPOFRM.

35. The system of claim 31, wherein there are ICPOL cycles of the input clock per line of the video signal, where ICPOL=ICPIL*ILPIFRM/ (2*OLPOFRM), where ICPIL is the number of input clock cycles per line of the image data, ILPIFRM is the number of lines of the image data per frame of the image data, and OLPOFRM is the number of lines of the video signal per frame of said video signal, and wherein the value T is equal to ICPIL* ILPIFRM, and the value A is equal to (2*OLPOFRM).

36. The system of claim 31, wherein the sync generator circuit is configured to be operable in any selected one of multiple operating modes.

37. The system of claim 36, wherein the operating modes include a first mode and a second mode, wherein in the first mode, there are ICPOL cycles of the input clock per line of the video signal, where ICPOL= ICPIL*ILPIFRM*2/OLPOFRM, where ICPIL is the number of input clock cycles per line of the image data, ILPIFRM is the number of lines of the image data per frame of the image data, and OLPOFRM is the number of lines of the video signal per frame of said video signal, the value T is equal to ICPIL*ILPIFRM*2, the value A is equal to OLPOFRM, and the initial value I is equal to zero, and in the second mode, the value T is equal to the number of input clock cycles per line of the video signal, the value A equal to one, and the initial value I is equal to zero.

38. The system of claim 29, wherein the output clock has frequency $XF_o$, X is an integer, and the frequency $F_i$ is equal to $(T/A)F_o$, and wherein the first circuitry comprises:

an accumulator configured to store a Count value, and to increase the Count value by the value A during each cycle of the input clock; and a comparator coupled to the accumulator and configured to perform a comparison of the Count value with the value T during each cycle of the input clock and to generate an output signal indicative of the result of each said comparison, wherein the accumulator is coupled to receive the output signal and configured to reduce the Count value by the value T−A when the output signal indicates that the Count value has risen to a value greater than the value T, and wherein the output signal is said control signal.

39. The system of claim 29, wherein the output clock has frequency $XF_o$, X is an integer, and the frequency $F_i$ is equal to $(T/A)F_o$, and wherein the first circuitry comprises:

an accumulator configured to store a Count value, and to decrease the Count value by the value A during each cycle of the input clock, wherein the accumulator is coupled to receive a frame start signal indicative of sequence of frame start events, and the accumulator is configured to set the Count value to an initial value I=X+T, whenever the frame start signal is indicative of one of the frame start events, where X is a value; and a comparator coupled to the accumulator and configured to perform a comparison of the Count value with the value X during each cycle of the input clock and to generate an output signal indicative of the result of each said comparison, wherein the accumulator is coupled to receive the output signal and configured to increase the Count value by the value T−A when the output signal indicates that the Count value has fallen to a value less than or equal to said value X, and wherein the output signal is said control signal.

40. The system of claim 29, wherein the output clock has frequency $XF_o$, X is an integer, and the frequency $F_i$ is equal to $(T/A)F_o$, and wherein the first circuitry comprises:

an accumulator configured to store a Count value, and to decrease the Count value by the value A during each cycle of the input clock, wherein the accumulator is coupled to receive a frame start signal indicative of sequence of frame start events, and the accumulator is configured to set the Count value to an initial value I=X+T, whenever the frame start signal is indicative of one of the frame start events, where X is a value; and a comparator coupled to the accumulator and configured to perform a comparison of the Count value with the value X during each cycle of the input clock and to generate an output signal indicative of the result of each said comparison, wherein the accumulator is coupled to receive the output signal and configured to increase the Count value by the value T−A when the output signal indicates that the Count value has fallen to a value less than said value X, and wherein the output signal is said control signal.

41. The system of claim 29, wherein said system is a video game system also including:

a player-manipulated input device; and a CPU coupled to the input device, wherein the video game system operates in response to at least one input signal from the input device while a display device displays frames of the video signal, and wherein at least one of the input device and the CPU is configured to perform a pointing device function to determine at least one pixel of one of the frames of the video signal being displayed, from the at least one input signal.

42. The system of claim 41, wherein at least one of the input device and the CPU is coupled to the sync generator circuit to receive the synthesized sync pulses, and said at least one of the input device and the CPU is configured to perform the pointing device function in response to said synthesized sync pulses and said at least one input signal, but not in response to the output clock.

43. A method for generating a train of synthesized sync pulses in response to an input clock having frequency $F_i$, said method including the steps of:

(a) generating a control signal in response to the input clock in accordance with the Bresenham algorithm, such that the control signal is indicative of events having time-averaged frequency at least nearly equal to $(A/T)F_i$, where A and T are integer values, and such that accumulated error, between a first time from a first one to a last one of Z consecutive ones of said events and a second time equal to $ZT/(AF_i)$, never exceeds $1/F_i$; and (b) generating the sync pulses in response to the control signal such that leading edges of the pulses occur at least nearly periodically, at said time-averaged frequency that is at least nearly equal to $(A/T)F_i$, and with accumulated error, between a third time from a first one to a last one of Z consecutive ones of said leading edges and the second time $ZT/(AF_i)$, that never exceeds $1/F_i$.

44. The method of claim 43, wherein step (a) including the steps of:

increasing a count value by the value A during each cycle of the input clock;

performing a comparison of the count value with the value T during each cycle of the input clock to generate the control signal, wherein said control signal is indicative of the result of each said comparison; and reducing the count value by the value T−A when the control signal indicates that the count value has risen to a value greater than or equal to said value T.

45. The method of claim 44, wherein step (a) also includes the step of resetting the count value to an initial value in response to a frame start signal, whenever the frame start signal is indicative of one of a sequence of frame start events.

46. The method of claim 43, wherein step (a) including the steps of:

increasing a count value by the value A during each cycle of the input clock;

performing a comparison of the count value with the value T during each cycle of the input clock to generate the control signal, wherein said control signal is indicative of the result of each said comparison; and reducing the count value by the value T−A when the control signal indicates that the count value has risen to a value greater than said value T.

47. The method of claim 43, wherein step (a) including the steps of:

(c) setting a count value to an initial value equal to X+T, where X is a value, in response to a frame start signal, whenever the frame start signal is indicative of one of a sequence of frame start events;

(d) after step (c), decreasing the count value by the value A during each cycle of the input clock;

(e) performing a comparison of the count value with the value X during each cycle of the input clock to generate the control signal, wherein said control signal is indicative of the result of each said comparison; and (f) increasing the count value by the value T−A when the control signal indicates that the count value has fallen to a value less than or equal to said value X.

48. The method of claim 43, wherein step (a) including the steps of:

(c) setting a count value to an initial value equal to X+T, where X is a value, in response to a frame start signal, whenever the frame start signal is indicative of one of a sequence of frame start events;

(d) after step (c), decreasing the count value by the value A during each cycle of the input clock;

(e) performing a comparison of the count value with the value X during each cycle of the input clock to generate the control signal, wherein said control signal is indicative of the result of each said comparison; and (f) increasing the count value by the value T−A when the control signal indicates that the count value has fallen to a value less than said value X.

49. A method of generating a train of synthesized sync pulses in accordance with the Bresenham algorithm in response to an input clock having frequency $F_i$, said method including the steps of:

increasing a count value by an integer value D during each cycle of the input clock;

performing a comparison of the count value with a threshold value N during each cycle of the input clock to generate a control signal, wherein the control signal is indicative of the result of each said comparison;

reducing the count value by the threshold value N−D when the control signal indicates that the count value has risen to a value greater than or equal to said threshold value N; and generating the sync pulses in response to said control signal.

50. The method of claim 49, also including the step of resetting the count value to an initial value in response to a frame start signal, whenever the frame start signal is indicative of one of a sequence of frame start events.

51. A method of generating a train of synthesized sync pulses in accordance with the Bresenham algorithm in response to an input clock having frequency $F_i$, said method including the steps of:

increasing a count value by an integer value D during each cycle of the input clock;

performing a comparison of the count value with a threshold value N during each cycle of the input clock to generate a control signal, wherein the control signal is indicative of the result of each said comparison;

reducing the count value by the threshold value N−D when the control signal indicates that the count value has risen to a value greater than said threshold value N; and generating the sync pulses in response to said control signal.

52. A method of generating a train of synthesized sync pulses in accordance with the Bresenham algorithm in response to an input clock having frequency $F_i$, said method including the steps of:

(a) setting a count value to an initial value equal to X+N, where X is a value and N is an integer value, in response to a frame start signal, whenever the frame start signal is indicative of one of a sequence of frame start events;

(b) after step (a), decreasing the count value by an integer value D during each cycle of the input clock;

(c) performing a comparison of the count value with the value X during each cycle of the input clock to generate the control signal, wherein said control signal is indicative of the result of each said comparison; and (d) increasing the count value by the value N−D when the control signal indicates that the count value has fallen to a value less than or equal to said value X.

53. A method of generating a train of synthesized sync pulses in accordance with the Bresenham algorithm in response to an input clock having frequency $F_i$, said method including the steps of:

(a) setting a count value to an initial value equal to X+N, where X is a value and N is an integer value, in response to a frame start signal, whenever the frame start signal is indicative of one of a sequence of frame start events;

(b) after step (a), decreasing the count value by an integer value D during each cycle of the input clock;

(c) performing a comparison of the count value with the value X during each cycle of the input clock to generate the control signal, wherein said control signal is indicative of the result of each said comparison; and (d) increasing the count value by the value N−D when the control signal indicates that the count value has fallen to a value less than said value X.

* * * * *